(12) United States Patent
Maeng (10) Patent No.: US 7,880,613 B1
(45) Date of Patent: Feb. 1, 2011

(54) SYSTEM, DEVICE AND METHOD FOR REMINDING A USER OF A FORGOTTEN ARTICLE

(76) Inventor: Joon Maeng, 5612 Sedona Dr., Austin, TX (US) 78759

( * ) Notice: Subject to any disclaimer, the term of this patent is extended or adjusted under 35 U.S.C. 154(b) by 503 days.

(21) Appl. No.: 11/052,702

(22) Filed: Feb. 7, 2005

(51) Int. Cl.
*G08B 13/14* (2006.01)

(52) U.S. Cl. ............ 340/572.1; 340/568.1; 340/539.11; 340/539.13; 340/10.42

(58) Field of Classification Search ............ 340/825.69, 340/572.1, 505, 506, 520, 10.4, 10.42, 10.51
See application file for complete search history.

(56) References Cited

U.S. PATENT DOCUMENTS

| 4,023,151 | A | | 5/1977 | Marham |
| 5,046,446 | A | | 9/1991 | Samrall et al. |
| 5,541,585 | A | * | 7/1996 | Duhame et al. ............ 340/5.62 |
| 5,608,378 | A | | 3/1997 | McLean et al. |
| 5,796,338 | A | * | 8/1998 | Mardirossian ............... 340/571 |
| 5,886,634 | A | * | 3/1999 | Muhme .................... 340/572.1 |
| 5,894,275 | A | | 4/1999 | Swingle |
| 5,936,527 | A | * | 8/1999 | Isaacman et al. ......... 340/572.1 |
| 5,952,921 | A | * | 9/1999 | Donnelly ................. 340/568.6 |
| 5,992,096 | A | * | 11/1999 | De La Cerda et al. ......... 49/169 |
| 6,002,334 | A | * | 12/1999 | Dvorak ..................... 340/568.1 |
| 6,057,762 | A | * | 5/2000 | Dusza ..................... 340/568.6 |
| 6,057,764 | A | * | 5/2000 | Williams ................. 340/572.1 |
| 6,078,251 | A | * | 6/2000 | Landt et al. ............... 340/10.41 |
| 6,118,376 | A | * | 9/2000 | Regester .................. 340/568.6 |
| 6,219,949 | B1 | | 4/2001 | Pang |
| 6,331,817 | B1 | * | 12/2001 | Goldberg ................. 340/573.1 |
| 6,462,660 | B1 | * | 10/2002 | Cannon et al. ........... 340/572.1 |
| 6,492,905 | B2 | * | 12/2002 | Mathias et al. .............. 340/540 |
| 6,549,142 | B2 | * | 4/2003 | Thomas et al. ........... 340/691.1 |
| 6,570,487 | B1 | * | 5/2003 | Steeves ....................... 340/5.2 |
| 6,669,650 | B1 | * | 12/2003 | Anker et al. ................. 600/551 |
| 6,840,451 | B2 | * | 1/2005 | Allen ..................... 235/462.09 |
| 6,961,000 | B2 | * | 11/2005 | Chung .................... 340/572.1 |
| 6,982,645 | B2 | * | 1/2006 | Ricci ....................... 340/572.1 |
| 6,989,749 | B2 | * | 1/2006 | Mohr ...................... 340/572.1 |
| 6,989,753 | B1 | * | 1/2006 | Lamming et al. ......... 340/573.1 |
| 7,142,120 | B2 | * | 11/2006 | Charych et al. .......... 340/572.4 |
| 7,212,121 | B2 | * | 5/2007 | Hashimoto et al. ....... 340/572.1 |
| 7,586,408 | B1 | * | 9/2009 | Mudge ........................ 340/541 |
| 2003/0102970 | A1 | * | 6/2003 | Creel et al. .............. 340/568.1 |
| 2004/0041696 | A1 | * | 3/2004 | Hull et al. ................ 340/10.42 |
| 2004/0119600 | A1 | * | 6/2004 | Hampton ................. 340/691.1 |
| 2004/0217859 | A1 | * | 11/2004 | Pucci et al. ............. 340/539.32 |
| 2005/0090915 | A1 | * | 4/2005 | Geiwitz ....................... 700/90 |
| 2005/0237196 | A1 | * | 10/2005 | Matsukawa et al. ....... 340/572.1 |
| 2006/0017541 | A1 | * | 1/2006 | Nguyen ...................... 340/5.81 |
| 2006/0033623 | A1 | * | 2/2006 | Hines et al. .............. 340/572.1 |
| 2006/0087407 | A1 | * | 4/2006 | Stewart et al. ........... 340/10.52 |

\* cited by examiner

*Primary Examiner*—Daniel Wu
*Assistant Examiner*—Son M Tang
(74) *Attorney, Agent, or Firm*—McDonnell Boehnen Hulbert & Berghoff LLP

(57) ABSTRACT

A system, device and method for reminding a user of a forgotten article are disclosed. According to one aspect, a reminder system includes an object identification discrimination module operable to identify at least one object identification tag proximally located to the object identification discrimination module in response to activating a discrimination operating mode of the object identification discrimination module. The reminder system further includes at least one object identification tag identifiable by the object identification discrimination module when proximally located to the object identification discrimination module.

38 Claims, 3 Drawing Sheets

SYSTEM, DEVICE AND METHOD FOR REMINDING A USER OF A FORGOTTEN ARTICLE

FIELD OF THE DISCLOSURE

The disclosure relates generally to reminder systems, and more particularly to a system, device and method for reminding a user of a forgotten article.

BACKGROUND

People often leave home without taking their mobile telephone, wallet, employee badge, or other important things. It is common that people forget one or more items when they leave home or office. Due to such forgetfulness, people may waste resources, such as time and opportunity, which may result in a financial loss or even a safety of an individual. Currently, some individuals may leave a memo or note on a door to remind a user of an item to be remembered. However, in some instances such memos may be misplaced or removed by others causing the individual to forget the item. In certain situations, individuals may be required to return home to gather an important article that was forgotten. For example, if a real-estate broker forgets his mobile telephone, the broker would have to return home to gather his phone. Such forgetfulness causes loss of time to the individual and may result in loss of opportunity. As such, there is a need for system which reminds people to take important items that have been forgotten when an individual leaves their office or home.

SUMMARY OF THE INVENTION

A system, device and method for reminding a user of a forgotten article are provided. In one form, reminder system includes an object identification discrimination module operable to identify at least one object identification tag proximally located to the object identification discrimination module in response to activating a discrimination operating mode of the object identification discrimination module. The reminder system further includes at least one object identification tag identifiable by the object identification discrimination module when proximally located to the object identification discrimination module.

In another form, a method of reminding a user to remember an article is provided. The method includes detecting motion proximal to an object identification discrimination module and determining if a valid object identification tag is not proximally located to the object identification discrimination module. The method further includes outputting a status in response to determining if a valid object identification tag is not proximally located to the object identification discrimination module.

In another aspect of the disclosure, an object identification tag operable to be detected by an object identification discrimination module is disclosed. The object identification tag includes a unique identification reference identifiable by an object identification discrimination module when not proximally located to the object identification discrimination module. The object identification tag further includes a housing including the unique identification reference. The housing is further operable to be provided in association with an article to remember when a user is proximally located to the object identification discrimination module.

In a further embodiment, a reminder system includes a motion sensor operable to sense a user proximally located to an object identification discrimination module. The reminder system further includes a processor operable to activate an object identification tag identifier to detect an object identification tag. The processor is further operable to determine when a valid object identification tag is not detected. The reminder system includes a display operable to output a reference to indicate that the valid object identification tag is not detected and an audio alarm operable to output an audio signal to indicate that the valid object identification tag is not detected

BRIEF DESCRIPTION OF THE DRAWINGS

Other advantages, features and characteristics of the invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

DETAILED DESCRIPTION OF THE INVENTION

Figure 1:
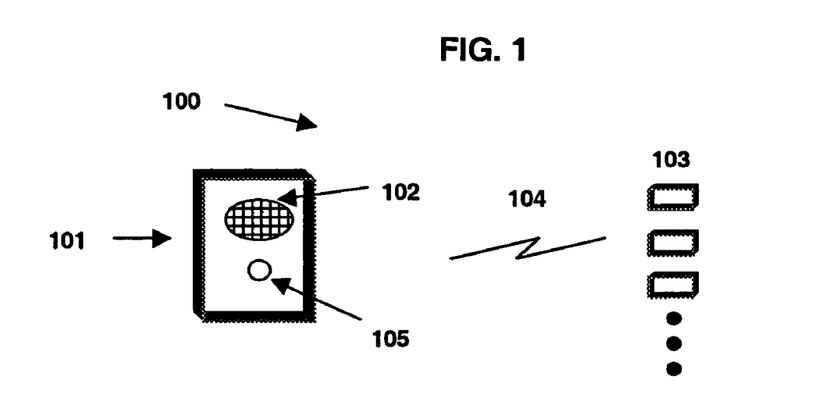
FIG. 1 illustrates a reminder system according to one embodiment of the invention.

FIG. 1 illustrates a reminder system according to one embodiment of the invention. A reminder system, illustrated generally at 100, includes an object identification discrimination module (OIDDM) 101 having a sensor 105 and a speaker or buzzer 102 for outputting a status to an individual in response to an item being forgotten. Reminder system 100 further includes one or more master object identification tags and/or object identification tag(s) 103 that may be detected by OIDDM 101 over a medium 104 when proximally located to OIDDM 101.

During use, OIDDM 101 may be placed on or near a door or entrance of a residence, place of business, vehicle, etc. Object identification tag(s) 103 may be coupled or attached to items (e.g., a mobile phone, wallet, keys, etc.) desired to not be forgotten as a user exits or leaves a location. For example, as a user approaches a door to leave a building having OIDDM 101 proximally located or coupled to the door, sensor 105 detects a user proximal to sensor 105 and OIDDM 101 detects if one or more object identification tag(s) 103 are proximal to OIDDM 101. If the user is leaving without one or more object identification tag(s) 103, OIDDM 101 determines that a user does not have one or more object identification tag(s) 103 and alerts the user via speaker 102 that an item has been forgotten. For example, speaker 102 may output an alarm or audio signal to alert an individual that an article or item has been forgotten.

In one embodiment, reminder system 100 includes an OIDDM 101 operable to identify at least one object identification tag 103 proximally located to OIDDM 101 in response to activating a discrimination operating mode of OIDDM 101. For example, discrimination may be activated in various ways including sensing a user leaving a residence, sensing movement of a door, a user activating an alarm system, sensing a user touching a portion of a door, or any other type of interaction such that OIDDM 101 may activate a discrimination operating mode to determine if an object identification tag 103 proximally located to OIDDM 101.

In one embodiment, OIDDM 101 may be programmed to detect three valid object identification tags 103. For example, a user may couple a first object identification module to a wallet, a second object identification module to an employee name badge, and a third object identification module to a cellular telephone. As such, when a user is proximally located to OIDDM 101, OIDDM 101 detects each object identification tag 103 and identifies each object identification tag 103 to determine whether one or more of object identification tag(s) 103 have been forgotten. If the user forgot an object identification tag 103 or an article having object identification tag 103, OIDDM 101 would provide an audio output (i.e. an alarm, a beep, siren, audio signal, etc.) indicating that an object identification tag 103 was not detected by OIDDM 101 and an item or article had been forgotten. In one embodiment, OIDDM 101 may include prerecorded or computer generated voice messages for a specific object identification tag(s) 103 that may be output via speaker 102 when OIDDM 101 detects that one or more object identification tag(s) 103 are not identified. For example, a first object identification tag 103 may be associated with a user's wallet and, if the user forgets their wallet, OIDDM 101 may output a message via speaker 102 stating that 'WALLET HAS BEEN FORGOTTEN'.

In one embodiment, reminder system 100 may be used within a vehicle to alert a user that an item has been forgotten prior to or when activating or starting a vehicle. For example, OIDDM 101 may be placed within a vehicle and when a user enters the vehicle, OIDDM 101 may determine if one or more object identification tag(s) 103 are proximal to the vehicle. If they are not, OIDDM 101 alerts a user that an item had been forgotten thereby keeping the individual from driving away from home or work without a forgotten item. Such an embodiment may be particularly useful in a multiple user environment allowing more than one individual that may reside in a home or building to keep reminder system 100 a specific individuals vehicle.

Figure 2:
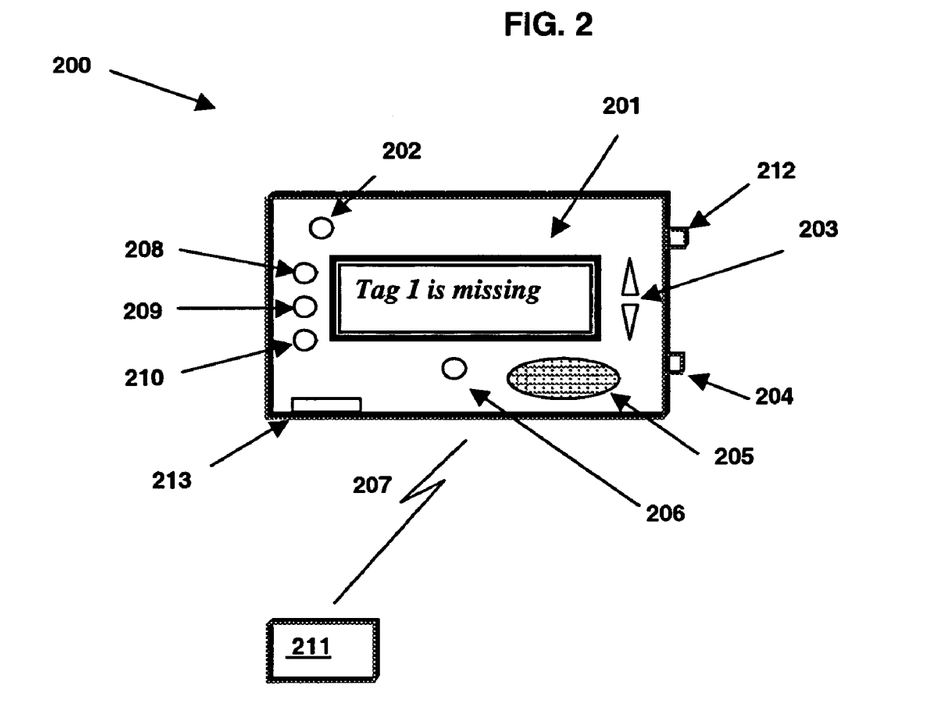
FIG. 2 illustrates an object identification discrimination module and object identification tag according to one embodiment of the invention.

FIG. 2 illustrates an object identification discrimination module and object identification tag according to one embodiment of the invention. An object identification discrimination module OIDDM 200 includes a sensor 206, a speaker 205, a Liquid Crystal Diode (LCD) display 201, a power indicator 202, a Input/Output (I/O) port 213, a first object identification tag indicator 208, a second object identification tag indicator 209, and a third object identification tag indicator 210. OIDDM 200 further includes an audible alarm activation or silence button 204, display scroll buttons 203 for display 201, and a repeat message button 212. During use, OIDDM 200 senses an individual leaving, for example, a building through detecting motion using sensor 206. For example, OIDDM 200 may be placed in a reduced power state until sensor 206 detects motion and initializes OIDDM 200 to an operating state. OIDDM 200 attempts to determine if object identification tag 211 is proximally located to OIDDM 200 using one or more detection techniques such as magnetic sensing, radio frequency detection, or other detection or identification techniques as needed. More than one object identification tag 211 may be used. If object identification tag 211 is not identified as being proximally located to OIDDM 200, OIDDM 200 produces a status output to provide a reminder to a user to identify that object identification tag 211 was not identified. For example, an output such as an audio alarm via speaker 205 and/or a visual alarm via display 201 and/or object identification tag indicators 208, 209, and/or 210 may be provided to a user.

For example, an audio alarm may include a beeping sound or warning message output by speaker 205 such as "Remember your cell phone". In another embodiment, display 201 may display the name or nomenclature of a missing or forgotten article that may include displaying a reference to object identification tag 211 such as 'Tag 1 is missing', 'Cell Phone was Forgotten', etc. In another embodiment, OIDDM 200 may illuminate a specific warning light corresponding to which object identification tag 211 is missing. For example, if OIDDM 200 is configured to detect or discriminate three object identification tags 211 (not expressly shown), and OIDDM 200 does not detect or identify the second of three object identification tag(s) 211, OIDDM 200 may illuminate second object identification tag indicator 209 to alert an individual that an article having second object identification tag has been forgotten.

In one embodiment, a user may prefer not to have audible sounds output by speaker 205. For example, an individual may be leaving a residence at an early hour and may not want to wake other individuals within the residence. As such, an individual may select audio alarm activation button 204 to activate or deactivate an audio alarm output by OIDDM 200. In another embodiment, a user may not have heard a message output by OIDDM 200 after OIDDM 200 detecting object identification tag 211 being missing. For example, a user may be distracted while leaving and may not have understood or heard an output message provided by speaker 205. As such, a user may select repeat message button 212 to hear the previous message output by OIDDM 200. One embodiment may also include providing a default message such as 'GOODBYE' or 'HAVE A NICE DAY' if OIDDM 200 detects all object identification tag(s) 211. In this manner, a user is provided positive feedback that all articles have been remembered.

In one embodiment, sensor 206 includes a motion sensor that detects movements within approximately two (2) meters of OIDDM 200. For example, if OIDDM 200 is coupled to a door (i.e. suspended from a door handle or door knob, coupled to a portion of the door, etc.) and an individual approaches the door, sensor 206 senses movements that are approximately two (2) meters from the door. In one embodiment, sensor 206 may also be directed toward a handle of a door and detects a user actively opening the door. For example, sensor 206 may be provided to detect a turning of the handle an individual initiates opening a door. In another embodiment, sensor 206 may be positioned to detect if the door is opening by detecting the movement of the door. Additionally, light sensors or other types of motion sensing devices may be used to detect if a door is being opened or if an individual is leaving a residence or building.

There may be multiple sensors (not expressly shown) to detect if the occupant is leaving the building or entering the building. For example, when an occupant is coming into the building OIDDM 200 may be activated to produce a warning even if missing object identification tags 211 are identified. On embodiment may include providing one sensor to detect if a door is moving and another sensor may sense human movement or presence. For example, if a first motion sensor detects movement first and then the opening door is detected, it implies that the occupant is leaving and OIDDM 200 should discriminate to determine if object identification tag(s) 211 are present. However, if a door opening is first sensed, and second motion sensor detects movement at approximately the same time, OIDDM 200 would not discriminate to determine if object identification tag(s) 211 are present due to an occupant entering the building. Other configurations and/or components may also be employed to determine if the occupant is entering or exiting a building.

In one embodiment, OIDDM 200 may include a magnet and a magnet switch (not expressly shown) between a door and doorframe to detect when a door is opening instead of or in combination with sensor 206. For example, a magnetic contact switch may be coupled to the door and doorframe. OIDDM 200 may further be electrically coupled to the magnetic contact and may be activated in response to breaking the magnetic contact.

In another embodiment, OIDDM 200 may also be connectable to or embedded in a security system (not expressly shown). For example, when a user is leaving a building or home, a user may activate an security system and OIDDM 200 may activate in association with a user activating the security system.

In one embodiment, OIDDM 200 may detect object identification tag 211 via a communication medium 207 such as a radio frequency communication medium. For example, object identification tag 211 may include an active or passive radio transmitter (not expressly shown) operable to be coupled to OIDDM 200 via a radio frequency communication medium to detect and identify object identification tag 211. Passive radio transmitters include passive Radio Frequency Identification (RFID) tags having unique identification numbers for identifying an RFID tag. Passive RFID tags typically do not include a power source and during operation, OIDDM 200 may be configured to include an object detector such as an RFID reader or interrogator (not expressly shown), which emits radio signals to read RFID tags. A passive RFID tag in receipt of the radio signal would use energy within the radio signals transmitted from OIDDM 200 as a power source and transmits or broadcast its own radio signal including a unique identification number via communication medium 207. OIDDM 200 would then detects the transmitted signal and discriminate whether the RFID tag is identified as a valid object identification tag. Passive RFID tags are typically detected within two (2) meters of an RFID reader or interrogator.

In one embodiment, OIDDM 200 may detect active RFID tags. For example, an active radio frequency signal transmitters may typically include a battery as a power source allowing for greater range of transmission of a unique identification number operable to be detected by OIDDM 200. In this manner, OIDDM 200 may not need to transmit a signal having sufficient power to activate object identification tag 211.

Another form of passive object electronic tags may include magnetic devices, magnetic sensors, magnetic tape, etc. For example, OIDDM 200 may include a magnetic sensor (not expressly shown) to detect if a magnetic tag is proximally located to OIDDM 200. Magnetic tags are typically short-range devices and may be detected by OIDDM 200 when affixed or coupled to an article. Both RFID tags and magnetic tags are well suited for placing or coupling to a surface of an article using one or more coupling mechanisms allowing for one form of flexible implementation. For example, passive tags may be thinly configured and are ideal for placing or taping to a surface of an article such as an employee identification badge, a driver's license or passport, credit cards, cellular telephones or other electronic devices, or may be placed within a wallet or purse, briefcase, backpack, day timer, or any other type of article that may be forgotten.

In one embodiment, OIDDM 200 may also use other radio frequency (RF) mediums as communication medium 207. For example, radio frequency transmitters have a short operating range radio frequency communication technologies or protocols including Bluetooth or IEEE 802.11x based radio technologies and communication protocols. In one embodiment, other types of mediums may also be used instead of, or in combination with communication medium 207. For example, an infrared or other light sensing medium may be used and Object identification tag 211 may be provided or positioned to be visually detected by OIDDM 200. For example, infrared or other light sensing mediums may be employed by OIDDM 200 to determine if object identification tag 211 having light sensing characteristics may be coupled to an article and detected by sensor 206 having light sensing capabilities. Other mediums may also be employed such that OIDDM 200 may determine if object identification tag 211 is proximally located to OIDDM 200. In one embodiment, object identification tag 211 may employ various shapes, sizes, coupling mechanisms, etc. For example, object identification tag 211 may include a thin flexible material that may be adhered to a surface of a wallet, cell phone, employee badge, driver's license, etc. Other coupling mechanisms may include providing object identification tag 211 as a part of a clip (i.e. paper clip, binder, etc.). For example, a clip may be easily clipped to an object such as document, CD, DVD, etc. Object identification tag 211 may also include a key holder-like device as a coupling mechanism, which may be easily hung in a key ring, luggage, equipment, etc. In one embodiment, some object identification tag(s) 211 may be permanently fixed or integrated as a part of an object. Other embodiments may include a removable object identification tag to allow use with various articles to be remembered from time to time. In one embodiment, OIDDM 200 may maintain a list of object identification tag(s) 211 to identify within a memory (not expressly shown) of OIDDM 200. For instance, OIDDM 200 maintain list including references for object identification tag(s) 211 coupled to cell phone, wallet and key chain. A list may be factory installed within OIDDM 200 and may correspond to specific items to be remembered. For example, OIDDM 200 may be provided with a series of object identification tag(s) 211, each tag having a unique nomenclature associated with a specific type of article to be remembered. A series of tags may be provided with a nomenclature or name of the article printed on the tag or on a list that may be used for installing tags on articles. On example may include providing a series of five object identification tag(s) 211 with each object identification tag 211 including a specific name of an article to be coupled to. In this manner, messages for each object identification tag 211 may be stored within OIDDM 200 and references to each object identification tag and/or article may be stored within a list or memory of OIDDM 200.

In one embodiment, a list may be entered by a user before using OIDDM 200. A tag list may also be revised at a later time when object identification tag(s) 211 are added or deleted. Such a revision may be accomplished either manually or electronically. For example, OIDDM 200 may include a programming button (not expressly shown) to modify a tag list stored within OIDDM 200. A programming button may be located inside a pinhole on the backside of OIDDM 200 and upon activation, a user may place one or more object identification tag(s) 211 near OIDDM 200 and activate a button inside of pinhole to make OIDDM 200 identify a new object identification tag 211 positioned near close to the OIDDM 200.

In another embodiment, OIDDM 200 may use an Input/Output (I/O) port 213 (e.g., USB port) to create and revise a tag list stored within memory of OIDDM 200. For example, I/O port 213 may include a communication port such as a USB port to communicate with an external memory device, computer system, external USB memory device, electronic device, etc. For example, a description or list including references to tags may be updated using an external memory device. For example, a computer system may include a user interface or program allowing a user to access one or more references to object identification tags being used by OIDDM 200. Upon a cable or connection being made to I/O port 213, a list of including references to object identification device(s) 211 may be updated, synchronized, etc. In this manner, an object identification device 211 may be used with a different article as need.

In one embodiment, the OIDDM 200 may be a component of a home network (not expressly shown). For example, OIDDM 200 may communicate with a home network over 802.11b, 802.11g, 802.11x, etc. or other types of home networks. References to object identification tag(s) 211 may be maintained within a list stored on a computer within the home network. When motion is detected, OIDDM 200 may obtain the list from the home computer and compare the identified object identification tag(s) 211 with the entries in the tag list to identify if any tag is missing. In another embodiment, OIDDM 200 may communicate references to the identified object identification tag(s) 211 to determine all valid object identification tag(s) 211 have been detected. The computer system may then communicate references or messages to OIDDM 200 indicating which object identification tag(s) 211 have not been detected. A message may include an identification number, nomenclature of an article, an audio file having an audio message, or any other identification reference for outputting a status of forgotten articles. Default messages may also be provided. In this manner, robust functions may be provided over the home network.

In one embodiment, the OIDDM 200 may use object identification tags having the same unique identification. For instance, a couple living in the same house may use object identification tag(s) 211 having the same identifier for wallets. In this manner, if one of them is leaving the house without the wallet, OIDDM 200 can alert an individual that indicates that a wallet has been forgotten. In another embodiment, a master object identification tag 211 may be provided with a specific user to identify which user is leaving a residence. For example, a master object identification tag 211 may be provided as a part of an object, such as a ring, necklace, etc. that may be worn by a user substantially all of the time. As a user attempts to leave a residence, OIDDM 200 may first determine if the master object identification tag 211 validating the user that is present and identifies all object identification tag(s) 211 for that specific user. In this manner, a multiple user's with specific items to be remembered may be determined by identifying a master object identification tag 211 for that user.

In one embodiment, OIDDM 200 may include a clock and activator that may be used to display the time of day on display 201 and activate when OIDDM 200 is to be used and/or which object identification tag(s) 211 are to be identified. For example, a user may set up OIDDM 200 to detect object identification tag(s) 211 between 7 A.M. and 10 A.M. and not detect object identification tag(s) 211 at other times or days of the week. Additionally, OIDDM 200 may be configured to identify some object identification tag(s) 211 during certain times of the day or night. For instance, OIDDM 200 may not identify the object identification tag 211 for employee badge during weekends and may continue to identify object identification tag(s) 211 for a wallet and cell phone during the weekends. Various other combinations may also be employed.

In one embodiment, OIDDM 200 may be used to find lost or misplaced object identification tag(s) 211. For example, OIDDM 200 may include a slide switch (not expressly shown) on the backside of OIDDM 200 operable to allow a user to select either a search mode or a reminder mode of operating OIDDM 200. When the switch is positioned in the search mode, sensor 206 may not be used and OIDDM 200 may be used by a user to find lost object identifications tag(s) 211. For instance, OIDDM 200 in search mode may be used to search for a lost wallet having a valid object identification tag 211 and misplaced within a house or residence. A user may carry OIDDM 200 and upon encountering the misplaced object identification tag 211, OIDDM 200 will beep allowing the user locate the wallet when proximally located to OIDDM 200 (e.g., 2 meters).

Figure 3:
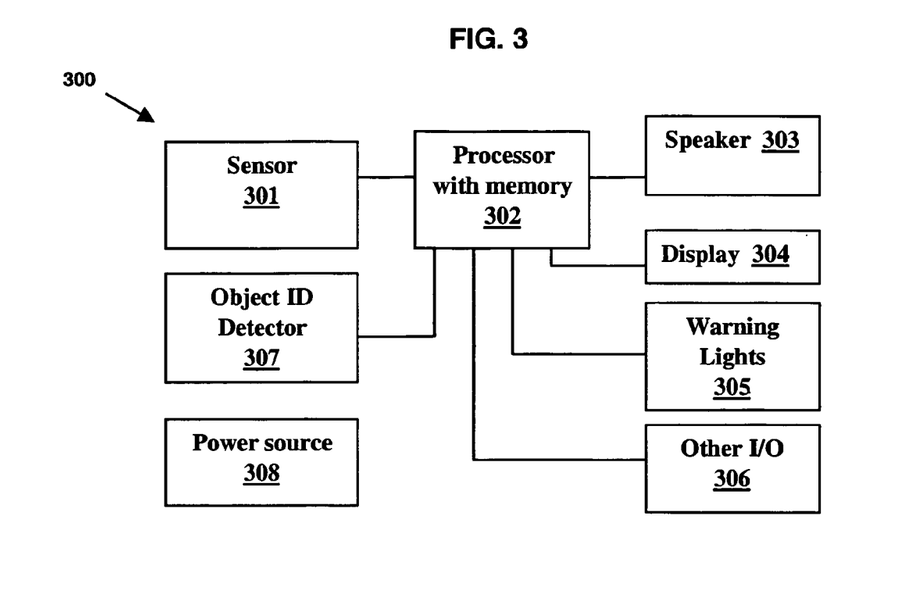
FIG. 3 illustrates a functional block diagram of an object identification discriminator module according to one embodiment of the invention.

FIG. 3 illustrates a functional block diagram of an object identification discrimination module according to one embodiment of the invention. Object identification discrimination module (OIDDM) 300 includes a sensor 301 such as motion sensor, magnetic switch sensor, infra-red sensor, heat sensor, and the like operable to be used by reminder system 300 to determine if an individual is about to leave or exit a building, vehicle, residence, room, etc. OIDDM 300 further includes an object identification detector 307 operable to detect and/or read active and passive object identification tags such as magnetic devices, RFIDs, short-range radio frequency transmitters, Bluetooth-enabled device and the like. Object identification detector 307 may be an RFID reader, magnetic sensor, or a sort-range radio frequency transmitters, Bluetooth enabled devices, receivers, and the like.

Figure 4A:
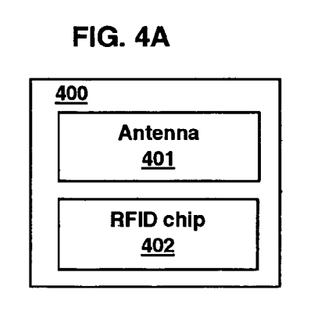
FIG. 4A illustrates a functional block diagram of passive object identification tag for use with a reminder system according to one embodiment of the invention.

OIDDM 300 further includes a processor 302 operable to process signals from sensor 301, object identification detector 307, input/output devices to provide a status and control of OIDDM 300 via one or more devices such as using warning light 305, speaker 303, display 304 and/or other various I/O devices 306. Processor 302 includes memory and/or may access memory such as Random Access Memory (RAM), Read Only Memory (ROM), Electrical Erasable Programmable Read Only Memory (EEPROM), Flash Memory, or other types or combination of volatile and/or non-volatile memory as needed. The memory maybe used to store a list of object identification tags to identify. Display 304 may include one or more types of displays such as an LCD display, Thick Film Transistor (TFT) display, a Flat Panel Display (FPD), mini-TFT display, and associated display driver circuits or modules (not expressly shown). Warning lights 305 may be provided in various colors, sizes, wattages, etc. and may include filament-based illuminators, Light Emitting Diodes (LEDs) or any other type of illuminator and/or illumination device. A power source 308 is provided for providing power to one or more component of OIDDM 300 and may include batteries and/or an AC adaptor sufficient to provide power to OIDDM 300. Input/output components 306 may also be provided and may include a power indicator, audio alarm activation switch, display scroll buttons, serial communication ports, parallel communication ports, network communication interfaces or modems, Universal Serial Bus Ports, removable memory media ports or card readers/writers, or any other type of I/O component. FIG. 4A illustrates a functional block diagram of passive object identification tag for use with an object identification discrimination module (OIDDM) according to one embodiment of the invention. Passive object identification tag 400 includes an enclosure or electronics packaging housing a radio frequency identification (RFID) enabled tag or an RFID tag having an antenna 401 and RFID chip 402. During operation antenna 401 receives RF signals from an RFID reader or interrogator which may be provided, for example, by OIDDM 300 illustrated in FIG. 3. Upon reception, RFID chip 402 rectifies or converts the RF signal into a direct current power level and uses the converted energy as a power source to power circuits within RFID chip 402. Upon providing power to various circuits within RFID chip 402, RFID chip 402 transmits a unique identification number for uniquely identifying passive object identification object 400 via antenna 401 which may then be detected by an object ID detector 307 (e.g., RFID reader) illustrated in FIG. 3

Figure 4B:
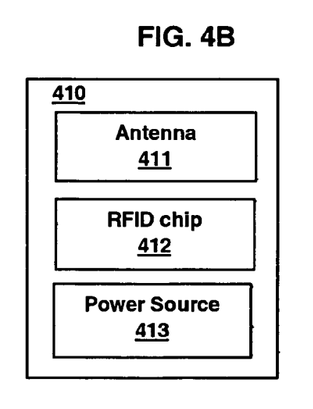
FIG. 4B illustrates a functional block diagram active object identification tag for use with a reminder system according to one embodiment of the invention.
Figure 5:
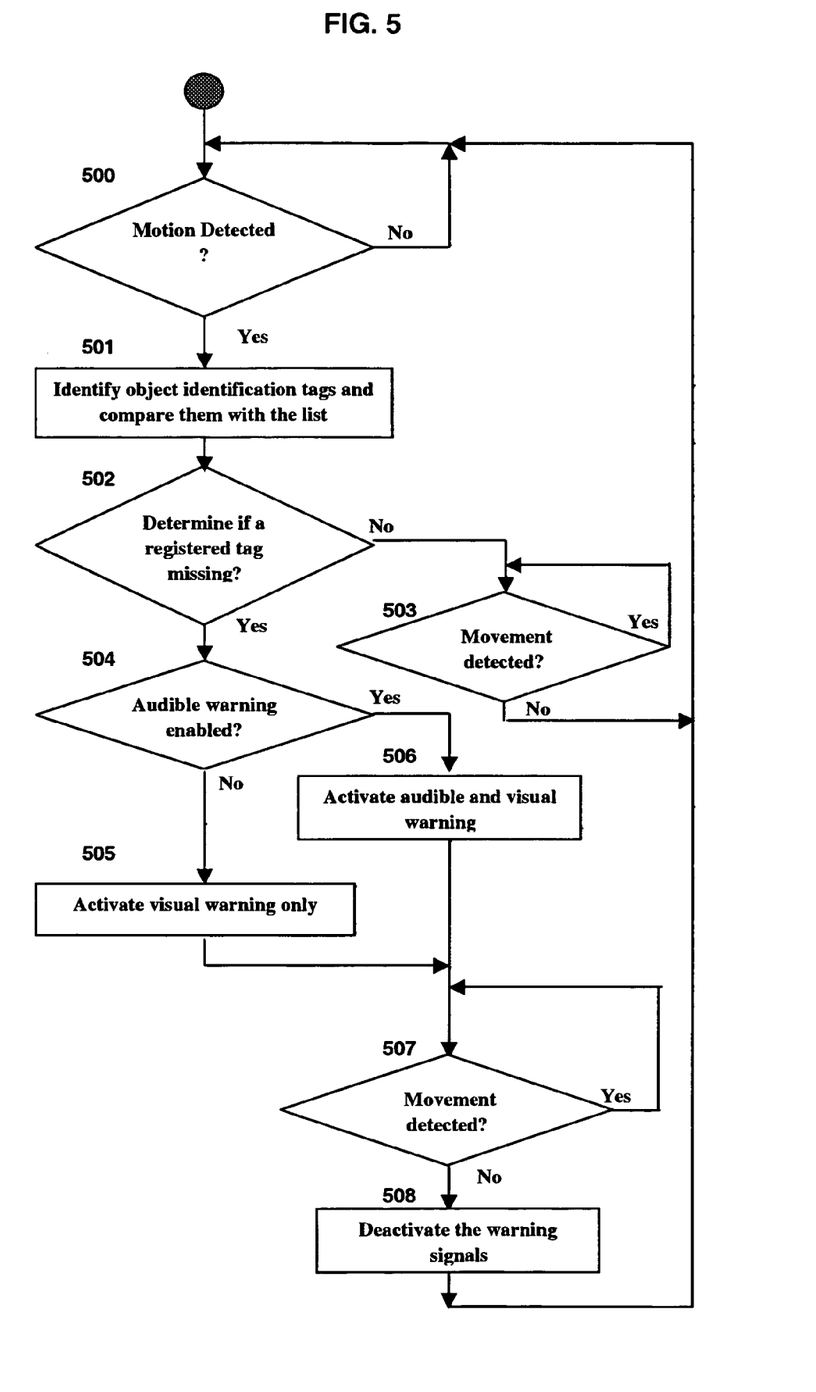
FIG. 5 illustrates a flow diagram of a method of providing a reminder system according to one embodiment of the invention.

FIG. 4B illustrates a functional block diagram of an active object identification tag 410 for use with an object identification discrimination module (OIDDM) according to one embodiment of the invention. An active object identification tag 410 includes an enclosure or electronics packaging housing an antenna 411, an RFID chip 412 and power source 413. Active object identification tag 410 uses power source 413, such as a battery or rechargeable power source to power each component within active object identification tag 410. When powered, RFID chip 412 produces radio or RF signals that are continuously broadcast via antenna 411 and include a unique identification number identifying active object identification tag 410. In this manner, an RFID detector or reader such as object ID detector 307 illustrated in FIG. 3 may detect the broadcast RF signal and determine the unique identification number transmitted by active object identification tag 410. FIG. 5 illustrates a flow diagram of a method of providing a reminder system according to one embodiment of the invention. The method may be employed by reminder system 100 illustrated in FIG. 1, object identification discrimination module 200 illustrated in FIG. 2, object identification discrimination system 300 of FIG. 3 or any other type of system operable to employ the method illustrated in FIG. 5. Additionally, the method may be embodied within a program of instructions, encoded logic, or a computer readable medium operable to be processed to employ the method of FIG. 5.

The method begins generally at 500 and monitors whether motion is detected proximal to a sensor or motion sensor operably associated with an object identification discrimination device. For example, if a user comes in close proximity to the motion sensor and motion is detected, object identification tags such as one or more an RFID tags are detected and compared to a list of references to valid object identification tags 501 stored with a valid object identification tag list. For example, an RFID interrogator operably associated with a sensor and an object identification discrimination device may read or identify all available RFIDs within range and compare the identified object identification tags to all valid object identification tags or identification numbers stored within a object identification tag list to determine if a valid or registered tag is missing. For example, a fixed set of references to valid object identification tags, such as object identification tag numbers, may be stored within memory and compared against the identified object identification tags to determine if a valid object identification tag is undetected.

If all valid object identification tags have been identified, the method pauses until movement is no longer detected 503 and then proceeds to step 500 where monitoring continues. If one or more valid object identification tags are missing or undetected, an audible warning may be provided 504 if enabled in addition to a visual warning 506 to alert the user that an article has been forgotten. If an audio warning is not desired at 504, only a visual warning is output 505 to the user. If additional movement is detected 507, the audio and or visual warning signal may continue until the movement stops or until the occupant leaves the premise and/or no motion is detected by the sensor. In one embodiment, a user may select an optional push button to temporarily stop the audible warning signals (not expressly shown), or the audio signal may be deactivated after a period of time if the motion remains detected. In another embodiment, a list of unidentified object identification tags may be displayed as a part of, or separate to, a visual warning on a display. For example, a display may include a single line display having a scroll button similar to scroll button 203 of FIG. 2 allowing an individual to view additional 10 unidentified object identification tags. If no additional movements are detected 507, the method proceeds to step 508 and deactivates the audio and/or visuals alarms and, continues step 500 and detects motion.

In one embodiment, if each valid object identification tag is identified, the method may not proceed to detect movement and may proceed to step 500. For example, the method may continuously determine if each previously identified object identification tag is detected and, after a period of time, may un-register each tag. Similarly, if each valid tag is continuously identified, a sensor or motion sensor may be deactivated until each previously identified identification tag is undetected. Other methods or combinations of methods or portion thereof for activating and deactivating sensors, motion sensors, displays, warnings, etc. may be provided for outputting a status in response to determining if a valid object identification tag is not proximally located to an object identification discrimination module.

Note that although an embodiment of the invention has been shown and described in detail herein, along with certain variants thereof, many other varied embodiments that incorporate the teachings of the invention may be easily constructed by those skilled in the art. Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. Accordingly, the invention is not intended to be limited to the specific form set forth herein, but on the contrary, it is intended to cover such alternatives, modifications, and equivalents, as can be reasonably included within the spirit and scope of the invention.

What is claimed is:

1. A system comprising:
  a master object identification tag associated with a corresponding set of one or more object identification tags; and
  an object identification discrimination module configured to (i) detect object identification tags including the master object identification tag and (ii) generate an alert in response to determining that the master object identification tag has been detected and that at least one object identification tag of the corresponding set of one or more object identification tags associated with the master object identification tag has not been detected, wherein the alert identifies the at least one non-detected object identification tag, and
  wherein the object identification discrimination module comprises a switch configured to selectively configure the object identification discrimination module into a search mode, wherein in the search mode, the object identification discrimination module is configured to generate an alert in response to being physically moved to within a defined proximity of the at least one non-detected object identification tag.

2. The system of claim 1 wherein object identification tags can be added to or removed from the corresponding set of one or more object identification tags by a user associated with the master object identification tag.

3. The system of claim 1 wherein the object identification discrimination module is configured to detect the master object identification tag, and then generate the alert upon determining that at least one object identification tag of a first subset of the corresponding set of one or more object identification tags has not been detected when a present day and/or time is during a first time period, and generate the alert upon determining that at least one object identification tag of a second subset of the corresponding set of one or more object identification tags has not been detected when the present day and/or time is during a second time period.

4. The system of claim 1 wherein the alert comprises at least one of a visible alert or an audible alert.

5. The system of claim 1 wherein any of the one or more object identification tags and the master object identification tag are tags selected from a group consisting of (i) removable tags capable of being affixed to an item by a user and (ii) integrated tags that have been affixed or installed into an item by the item's manufacturer.

6. The system of claim 1 wherein the alert comprises a text string corresponding to a non-detected object identification tag.

7. The system of claim 1 wherein the alert comprises a pre-recorded or computer generated audible message corresponding to a non-detected object identification tag.

8. The system of claim 1 further comprising a proximity sensor configured to (i) detect the presence of a user and (ii) instruct the object identification discrimination module to initiate an attempt to detect the master object identification tag and the corresponding set of one or more object identification tags in response to detecting the presence of a user.

9. The system of claim 8 wherein the proximity sensor comprises a motion sensor.

10. The system of claim 8 wherein the proximity sensor comprises a contact switch.

11. The system of claim 1 wherein any of the one or more object identification tags and the master object identification tag are tags selected from a group consisting of (i) active tags and (ii) passive tags.

12. The system of claim 1 wherein object identification tags can be added to or removed from the set of one or more object identification tags via one or more commands entered via a physical user interface on the object identification discrimination module.

13. The system of claim 1 wherein each object identification tag is associated with a physical object.

14. A method comprising:
  detecting a master object identification tag, wherein the master object identification tag is associated with a corresponding set of one or more object identification tags;
  generating an alert in response to determining that at least one object identification tag of the corresponding set of one or more object identification tags associated with the master object identification tag has not been detected, wherein the alert identifies the at least one non-detected object identification tag;
  entering a search mode; and
  while in the search mode, generating an alert in response to an object identification tag identifier being physically moved to within a predetermined proximity of a the at least one non-detected object identification tag.

15. The method of claim 14 further comprising:
  adding object identification tags to and/or removing object identification tags from the corresponding set of one or more object identification tags associated with the master object identification tag.

16. The method of claim 14 further comprising:
  determining whether a present day and/or time is during a first time period or a second time period;
  generating the alert in response to determining that at least one object identification tag of a first subset of the corresponding set of one or more object identification tags has not been detected when the present day and/or time is during the first time period; and
  generating the alert in response to determining that at least one object identification tag of a second subset of the corresponding set of one or more object identification tags has not been detected when the present day and/or time is during the second time period.

17. The method of claim 14 wherein the alert comprises at least one of a visible alert or an audible alert.

18. The method of claim 14 wherein the alert comprises a text string corresponding to a non-detected object identification tag.

19. The method of claim 14 wherein the alert comprises a pre-recorded or computer generated audible message corresponding to a non-detected object identification tag.

20. The method of claim 14 further comprising:
  detecting the presence of a user; and
  in response to detecting the presence of a user, initiating an attempt to detect the master object identification tag and the corresponding set of one or more object identification tags.

21. The method of claim 20 wherein detecting the presence of a user is performed by a motion sensor.

22. The method of claim 20 wherein detecting the presence of a user is performed by a contact switch.

23. The method of claim 14 wherein any of the one or more object identification tags and the master object identification tag are tags selected from a group consisting of (i) active tags and (ii) passive tags.

24. The method of claim 14 further comprising:
  adding object identification tags to and/or removing object identification tags from the corresponding set of one or more object identification tags associated with the master object identification tag via a physical user interface.

25. The method of claim 14 wherein each object identification tag of the set of one or more object identification tags is associated with a physical object.

26. A system comprising:
  a first input configured to receive a motion detection indication signal from a motion detector;
  an object identification tag identifier configured to detect a master object identification tag and to detect a corresponding set of one or more object identification tags associated with the master object identification tag;
  a processor configured to activate the object identification tag identifier in response to the motion detection indication signal, and to generate an alert in response to determining that the master object identification tag has been detected and that at least one object identification tag of the corresponding set of one or more object identification tags associated with the master object identification tag has not been detected, wherein the alert identifies the at least one non-detected object identification tag; and
  a switch configured to selectively configure the system into a search mode, wherein in the search mode, the processor is configured to generate an alert in response to being physically moved to within a defined proximity of the at least one non-detected object identification tag.

27. The system of claim 26 further comprising a display output configured to provide a signal to a display device configured to display the alert.

28. The system of claim 26 further comprising a speaker output configured to provide a signal to a speaker configured to play the alert.

29. The system of claim 26 wherein the alert comprises a text string corresponding to a non-detected object identification tag.

30. The reminder system of claim 26 wherein the alert comprises a pre-recorded or computer generated audible message corresponding to a non-detected object identification tag.

31. The system of claim 26 wherein object identification tags can be added to or removed from the corresponding set of one or more object identification tags by a user associated with the master object identification tag.

32. The system of claim 26 wherein each object identification tag is associated with a physical object.

33. The system of claim 26 further comprising a second input configured to receive a switching indication signal from a switch, wherein the processor is configured to activate the object identification tag identifier in response to the motion detection indication signal and/or the switching indication signal.

34. The system of claim 26 further comprising one or more master object identification tags and one or more object identification tags.

35. The system of claim 26 wherein the motion detection indication signal from the motion detector is configured to distinguish between a person leaving a location where the object identification tag identifier is positioned from a person entering or passing by a location where the object identification tag identifier is positioned.

36. The system of claim 26 further comprising a second input configured to receive an activation signal to activate the system in response to receiving the activation signal from a security system.

37. The system of claim 26 wherein the object identification tag identifier is a component of a home network.

38. The system of claim 26 wherein the one or more object identification tags in the corresponding set of one or more object identification tags associated with the master object identification tag is based on a day of the week and a time of day.

* * * * *

UNITED STATES PATENT AND TRADEMARK OFFICE
CERTIFICATE OF CORRECTION

| | | |
|---|---|---|
| PATENT NO. | : 7,880,613 B1 | Page 1 of 1 |
| APPLICATION NO. | : 11/052702 | |
| DATED | : February 1, 2011 | |
| INVENTOR(S) | : Maeng | |

It is certified that error appears in the above-identified patent and that said Letters Patent is hereby corrected as shown below:

Column 11, line 66, in Claim 14, delete "of a the" and insert -- of the --.

Column 13, line 12, in Claim 30, delete "reminder system" and insert -- system --.

Signed and Sealed this
Thirty-first Day of May, 2011

David J. Kappos
*Director of the United States Patent and Trademark Office*